March 17, 1970    ISAO GOKYU    3,500,625
PARALLEL CABLES

Filed May 15, 1968    2 Sheets-Sheet 1

INVENTOR

ISAO GOKYO

BY

ATTORNEYS

March 17, 1970  ISAO GOKYU  3,500,625
PARALLEL CABLES

Filed May 15, 1968  2 Sheets-Sheet 2

INVENTOR
ISAO GOKYO
BY
ATTORNEYS

United States Patent Office 3,500,625
Patented Mar. 17, 1970

3,500,625
PARALLEL CABLES
Isao Gokyu, 3, 10, 2-chome Nishikubo Masashino-shi, Tokyo, Japan
Filed May 15, 1968, Ser. No. 729,150
Claims priority, application Japan, May 17, 1967, 42/30,868, 42/30,869
Int. Cl. D02g 3/00
U.S. Cl. 57—139      4 Claims

ABSTRACT OF THE DISCLOSURE

A cable, for suspension bridges or the like, comprises wires having a hexagonal cross section. These wires are grouped into strands likewise having a hexagonal cross section, and the strands are grouped into the cable. The cross section of the wires, when the cable is used in a suspension bridge or the like, is reduced in accordance with the variations in the stresses effective along the length of the cable.

BACKGROUND OF THE INVENTION

As the suspension elements for suspension bridges, for example, there have been used parallel line wires, stranded rope, locked coil rope, spiral rope, etc. All of these, except locked coil rope, consists of circular wires which are stranded in a predetermined manner. The locked coil rope consists of circular wires wound with flat wire. In most cases of very large and long suspension bridges, parallel wires are used.

SUMMARY OF THE INVENTION

This invention relates to parallel wire cables such as used for in suspension bridges and the like and, more particularly, to a novel, improved, more compact, and less expensive wire cable.

Parallel wire cables have a number of advantages, including the following:

(1) There is no stranding loss, so that the cutting load is the largest and, in consequence, the effective cross sectional area of the wire is the largest.

(2) The elastic modules is high and the residual elongation is small.

(3) The distribution of stresses is uniform.

(4) Due to the even surface, the construction of a cable band is simple.

(5) For a very large and long suspension bridge, the construction cost decreases.

Nevertheless, there are disadvantages in using parallel wire cables, as will be pointed out hereinafter.

For an understanding of the principles of the invention, reference is made to the following description of typical embodiments thereof, as illustrated in the accompanying drawings.

DETAILED DESCRIPTION OF THE PREFERRED EMBODIMENTS

Figure 1:
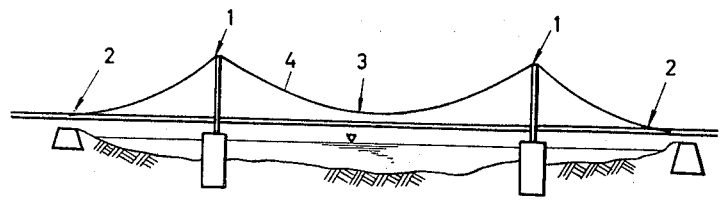
FIG. 1 is side elevation view of a suspension bridge.

In FIG. 1, the saddle parts of the main towers are indicated at 1, the cable anchors at 2, and the central part of the main span 3, which is the central part between the saddles 1, 1. An example of the tensions effective upon various parts is as follows, wherein the formula for a parabolic cable is adopted in order to simplify the calculation, and only the uniformly distributed load is taken into consideration as the load.

Let the horizontal tension be H, the cable tension be T, and the maximum tension $T_{max}$, so that the following equations are obtained:

$$H = \frac{wl^2}{8} \quad (1)$$

$$T = H \sec \alpha = H\sqrt{1+\tan^2\alpha} \quad (2)$$

$$T_{max} = H \sec \cdot \alpha_0 = H\sqrt{1+16n^2}$$

Hereby:
$w$: Unit load
$l$: effective span
$f$: sag
$\alpha$: angle between the inclination of cable and the horizontal plane
$\alpha_0$: angle between the inclination of the cable at the main tower and the horizontal plane $$n = \frac{f}{l} \text{ :sag ratio}$$

The maximum tension occurs at the saddles of the main towers, so that the ratio $c$ of the tension at saddles 1 to that at the central part 3 of the main span is as follows:

$$c = \frac{H}{T_{max}} = \frac{H}{H\sqrt{1+16n^2}} = \frac{1}{\sqrt{1+16n^2}}$$

From this equation, it will be noted that the ratio $c$ varies according to variations of the sag ratio $n$. With the sag ratio generally adopted for a suspension bridge, the values of $c$ are calculated as in the following table:

| $n$: | $c$ |
|---|---|
| 1/7 | 0.87 |
| 1/8 | 0.89 |
| 1/9 | 0.91 |
| 1/10 | 0.93 |
| 1/11 | 0.94 |
| 1/12 | 0.95 |

As can be seen from the above table, the tension effective upon the cable at the central part 3 is 87–95% of that at the saddles 1. Furthermore, the tension at the anchors 2 is almost the same as that at the central part 3.

For planning the cable, the sectional area is calculated for the maximum tension, so that the tensions at the anchors 2 the saddles 1 and the central part 3 are over calculated and, if the strength of every part of the cable is equal, the sectional areas at the above-mentioned parts can be reduced to 87–95% of the maximum.

Figure 3:
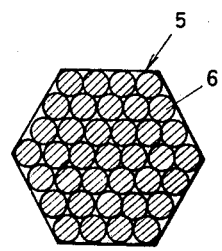

An ordinary parallel wire cable is constructed with circular wires, as shown in FIG. 3. In accordance with the aerial wiring method, the strand is also circular.

One of the most important considerations of the cable for a suspension bridge is the percentage of voids. The percentage of voids is the ratio of the sectional area of the cable, other than that part of the sectional area occupied by the cable wires, to the sectional area of the entire cable, or the overall sectional area of the cable. In the case of a small percentage of voids, the rigidity of the cable is large and, in consequence, the constructional elongation of the cable is small. Furthermore, in the case where the percentage of voids is small, there is, for example, a great advantage due to intimate compacting of the cable, resulting in an economical use of the lapping or wrapping material.

Although, theoretically, the percentage of voids of parallel wire cables with circular section wires is 10%, it has been indicated that, when the circular wires are formed into a cable, the percentage of voids is about 24%, for ordinary aerial wiring, and about 19%, for strand-type installations.

Theoretically, the percentage of voids can be reduced to zero using parallel wires with a triangular or rectangular cross section. However, there are difficulties which handicap the practical use of triangular or rectangular cross section parallel wires to form a cable. Thus, in the case of wires with a triangular cross section, six wires can be assembled together into a hexagonal section, whereby the number of wires is greater than the number required when using wires with pentagonal section, when the wire is constructed into a strand, resulting in an increase of the manufacturing cost of the strand.

In the case of wires with a rectangular cross section, the strand also must be rectangular, so that, when formed into a cable, it is difficult to make the cable circular in cross section. Furthermore, it is difficult to prevent the slippage along the sectional direction when the wires are gathered into the cable.

Additionally, in the case of both triangular and rectangular cross section wires, the wire edges are all acute angles, so that there is the danger that the individual wires will be worn due to the mutual friction between the wires when the wires are assembled into a strand, so that the percentage of voids would increase. As compared to the various disadvantages of wires with triangular or rectangular cross sections, when used to form a cable and as mentioned above, a hexagonal cross section wire and cable in accordance with the present invention is free of these disadvantages and may be applied in the same manner as an ordinary cable or wire.

Thus, the objective of the present invention is to provide a new parallel wire cable for a suspension bridge, and which avoids the disadvantage, characteristic of a conventional cable because of its uniform sectional area along the whole length of the bridge, and at the same time overcomes the disadvantages, characteristic of conventional wires with a certain circular section. Referring again to the drawings, in FIG. 2, hexagonal cross section wires are indicated at 6 and are formed into a hexagonal cross section strand 5 assembled, for example, from 37 wires 6.

Figure 2:
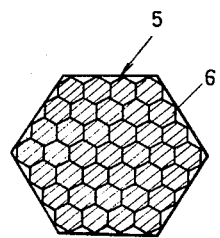
FIGS. 2 and 3 are cross sectional views of cable strands in accordance with the invention.
Figure 4:
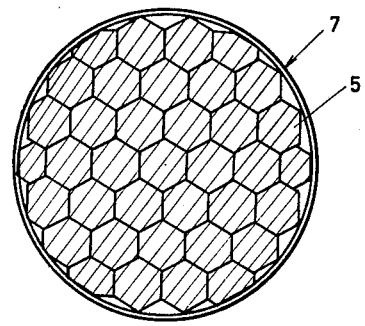
FIG. 4 is a cross sectional view of a cable in accordance with the invention.
Figure 5:
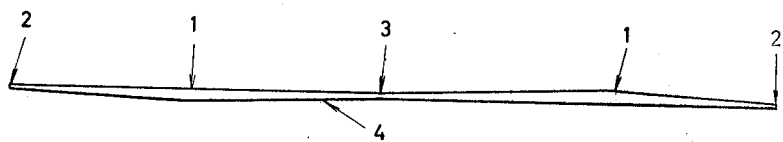
FIG. 5 is a side elevation view of the cable.
Figure 6:
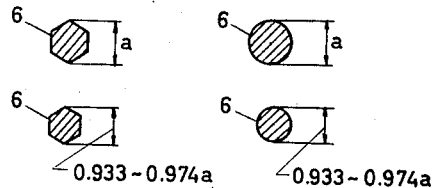
FIG. 6 is a series of cross sectional views of the cable shown in FIG. 5.

FIG. 3 illustrates a similar strand, but which uses wires 6 having a circular cross section. FIG. 4 illustrates a cable comprising a plurality of hexagonal strands 5, such as shown in FIG. 2. FIG. 5 is a side elevational view of the entire length of the cable and FIG. 6 illustrates sections of the wires.

As shown in FIG. 4, a cable can comprise 7, 37, 61, 91, 127, or more strands, while an individual strand 5 can comprise 7, 19, 37, 61, 91, 127 or more parallel wires, as shown in FIGS. 2 and 3.

Is mentioned above, the tension effective upon a cable is not uniform along the entire length of a suspension bridge, so that the tension effective upon an individual wire of the cable is also not uniform along its entire length.

Briefly, it is sufficient that the cross sectional area of the wire or cable at both ends and at the central part of the bridge, between the saddles, should be 87–95% of the cross sectional area of the wire and cable at the saddles. As illustrated in FIG. 6, the cross sectional area of the wires and of the cables is uniformly reduced from the saddle portions of the cable toward the central part of the cable and from the saddle portions of the cable to the ends of the cable. Thus, the cross sectional areas of the wire and cables at the saddles 1 is 100% of the cross sectional area of the wires and cables and, at the central part 3 and at the anchoring parts 2 of the wire or cable, the cross sectional area is reduced to 87–95% of the maximum cross sectional area of the wires or cable. Thus, when several tens of the wires are assembled into a strand and several tens of such strands are assembled into a parallel cable, with the cross sectional areas of the wires and strands reduced as just described, the weight of the wires and of the cable is decreased by about 4% on the average, resulting in a substantial economy.

The reduction of the cross sectional area of the wire to about 95–87% means, as illustrated in FIG. 6, a reduction of the wire diameter to about 97.4–93.3% of the maximum diameter.

The wires used in such cables are usually cold worked down to about 80% of the original cross sectional area whereby, in the case where the cross sectional area at the central part is reduced to 87% of that at the saddle parts, the working ratio on the raw wire varies about 3%, this having little influence upon its strength. With wires having such uniformly reduced cross section, the same effect can be obtained using either circular or polygonal cross sections.

As compared with circular cross sectional wires and cables used ordinarily for suspension bridges, the percentage of voids, using wires having a hexagonal cross section as shown in FIG. 2, is theoretically null, whereby the strand and the cable are made very compact so that the rigidity of the cable is increased, while the constructional elongation of the cable is decreased. Furthermore, there is a resulting economy in the material for lapping or wrapping the cable.

Using cables in accordance with the invention, the net-weight of a very long and large suspension bridge is decreased, and, consequently, the weight of the foundations of the main towers can be made smaller. Furthermore, there is an additional advantage in that the cable can be installed more easily. Additionally, at those parts of the cable having a reduced cross sectional area, the wind load is accordingly reduced.

As mentioned above, aerial wiring and strand installation are used in the installation of parallel cables. With respect to the construction time and cost, the strand installation is advantageous, and this is especially true at locations subjected to continuous strong winds where aerial wiring may not be able to be performed. When a parallel cable consisting of tapered wires is installed according to the strand installation method, a much more economical parallel cable can be obtained, to say nothing of the above-mentioned advantages.

As shown in FIG. 3, a conventional strand is formed of wires having a circular cross section, while a strand embodying the invention is formed with wires having a hexagonal cross section, so that the strand itself has a hexagonal cross section as shown in FIG. 2. When the wires have hexagonal cross sections, they lie in close contact with each other and theoretically there are no voids between the wires. When 19, 37, 61, 91, 127, 169 or more hexagonal wires are used in one strand, the strand itself has, overall, a hexagonal cross section, whereby it has no internal voids but only small voids around its circumference. Furthermore, when these strands are assembled, a very compact cable, with a very small percentage of voids, can be produced by assembling the above-mentioned number of strands, as shown in FIG. 4.

The smaller the percentage of voids, the greater is the rigidity of the cable and the smaller is the constructional elongation of the cable. Thus, the rigidity of the entire construction is greatly increased and the stability is improved. Adjustment of the sag at the time of installation is easier. Additionally, the cable can be compacted tightly, and there is an economy in the lapping or wrapping material, so that the diameter of the cable is decreased which is convenient for cable installation, resistance against the wind load, and other factors.

In the present invention, the wire itself has a hexagonal cross section, so that there is no need to apply any compression on the strand. Thus, there is no residual internal stress, and no decrease of strength due to Bauschinger effect. As shown in FIG. 1, the tension of the cable is not equal along the entire length of the suspension bridge, but ranges from 100% to 91%, so that greater economy can be obtained by using wires whose cross sectional area is uniformly reduced toward those portions having the less tension, and as shown in FIGS. 5 and 6.

In case wires having a hexagonal section are assembled together into a strand having a hexagonal section in a factory, and then installed, there are very great advantages. Furthermore, the parallel cable embodying the invention can be used not only for a suspension bridge but also for other purses, such as support wires for suspension roofs of buildings.

What is claimed is:

1. A parallel wire suspension cable comprising a plurality of parallel strands of hexagonal cross section, each strand comprising a plurality of parallel wires of hexagonal cross section.

2. A parallel wire suspension cable for a suspension bridge, arranged to be extended between a pair of anchors and over saddles each adjacent a respective anchor, the cable including a central section between the saddles having a midpoint, said cable having a maximum cross sectional area at said saddles and the cross sectional area of said cable at its ends and at said midpoint being from 87 to 95% of its maximum sectional area; said cable tapering in cross sectional area between said saddles and said midpoint and between said saddles and said anchors.

3. A parallel wire suspension cable for a suspension bridge, as claimed in claim 2, comprising a plurality of parallel strands of hexagonal cross section, each strand comprising a plurality of parallel wires of hexagonal cross section.

4. A parallel wire suspension cable for a suspension bridge, as claimed in claim 2, comprising a plurality of parallel strands of substantially circular cross section, each strand comprising a plurality of parallel wires of substantially circular cross section.

References Cited

UNITED STATES PATENTS

| | | | |
|---|---|---|---|
| 98,620 | 1/1870 | Parker | 14—22 |
| 625,902 | 5/1899 | Rieppel | 14—22 |
| 1,797,759 | 3/1931 | De Forest | 14—22 |
| 2,050,298 | 8/1936 | Everett | 57—145 XR |
| 2,407,634 | 9/1946 | Du Pont | 57—139 XR |

FOREIGN PATENTS

| | | |
|---|---|---|
| 706,970 | 7/1931 | France. |
| 869,977 | 1/1953 | Germany. |

DONALD E. WATKINS, Primary Examiner

U.S. Cl. X.R.

14—22